United States Patent [19]

Lombardi et al.

[11] Patent Number: 5,360,177
[45] Date of Patent: * Nov. 1, 1994

[54] TOOL CHANGING APPARATUS FOR AN ARMATURE WINDING MACHINE

[75] Inventors: Massimo Lombardi; Gianluigi Pisani, both of Florence, Italy

[73] Assignee: Axis USA, Inc., Marlborough, Mass.

[*] Notice: The portion of the term of this patent subsequent to Nov. 2, 2010 has been disclaimed.

[21] Appl. No.: 102,149

[22] Filed: Aug. 4, 1993

Related U.S. Application Data

[63] Continuation of Ser. No. 874,959, Apr. 23, 1992, Pat. No. 5,257,744, which is a continuation of Ser. No. 531,843, May 31, 1990, Pat. No. 5,127,594.

[51] Int. Cl.⁵ .................... H02K 15/09; 29 605; 29 596
[52] U.S. Cl. .................... 242/7.05 B
[58] Field of Search .......... 242/7.05 B, 7.05 R, 242/7.05 A, 7.05 C; 29/605, 596

[56] References Cited

U.S. PATENT DOCUMENTS

| | | | |
|---|---|---|---|
| 3,673,878 | 7/1969 | Biddison | 242/7.05 B |
| 3,927,843 | 12/1975 | Dammar | 242/7.05 B |
| 4,087,054 | 5/1978 | Finegold | 242/7.05 B |
| 4,708,297 | 11/1987 | Boers | 242/7.05 B |
| 4,786,004 | 11/1988 | Boers | 242/7.05 B |
| 4,826,092 | 5/1989 | Tsugawa | 242/7.05 B |
| 4,915,313 | 4/1990 | Banner | 242/7.05 B |
| 5,127,594 | 7/1992 | Lombardi | 242/7.05 B |
| 5,257,744 | 11/1993 | Lombardi | 242/7.05 B |

*Primary Examiner*—Katherine Matecki
*Attorney, Agent, or Firm*—Karen G. Horowitz; Robert R. Jackson

[57] ABSTRACT

Methods and apparatus for changing the collet assembly or armature-holding assembly of an armature winding machine are provided. The apparatus permits the collet assembly and selected sleeves of the armature-holding assembly to rotate about a longitudinal axis, while preventing undesirable translation along the axis. The apparatus permits translation of at least one other sleeve. The collet assembly may be removed from the armature-holding assembly to accommodate armature shafts of various diameters. Alternatively, the entire armature-holding assembly may be removed and replaced as a single unit, to accommodate commutators of various diameters. The change-over process can be automated.

20 Claims, 9 Drawing Sheets

TOOL CHANGING APPARATUS FOR AN ARMATURE WINDING MACHINE

This is a continuation of patent application Ser. No. 07/874,959, filed Apr. 23, 1992, now U.S. Pat. No. 5,257,744, issued Nov. 2, 1993,which was a continuation of patent application Ser. No. 07/531,843, filed May 31, 1990, now U.S. Pat. No. 5,127,594, issued Jul. 7,1992.

BACKGROUND OF THE INVENTION

This invention relates to a machine for winding an armature of an electric motor or a similar machine such as a generator. More particularly, this invention relates to apparatus for holding an armature in the winding machine, which can be quickly and automatically changed to accommodate a differently sized armature.

To wind the armature of a motor or generator, wire is wrapped around an armature core, i.e., in slots in the armature. The shaft of the armature must be rotated to position the slots to receive wire. This process typically is performed automatically by a conventional winding machine. The winding machine typically includes a gripping device, which holds and automatically rotates the armature shaft.

At predetermined stages of the winding process, lead wires from the armature being wound are connected to a commutator by passing the lead wires around a commutator hook or tang. To prevent the lead wires from catching onto the commutator, the gripping device which holds the shaft typically includes one or more sleeves for selectively covering the commutator hooks. The sleeve is translated along the longitudinal axis of the armature shaft to cover or expose a hook as required.

Because the diameter of an armature shaft or commutator varies from armature to armature, it is desirable to provide an armature winding machine which can accept a variety of armature gripping devices. When winding armatures of different sizes, it may be necessary to change the sleeves associated with the gripping device to accommodate differently sized commutators. Alternatively, it may only be necessary to change the gripping device (i.e., and not the sleeves).

To increase manufacturing productivity and efficiency, changing the gripping device or the gripping device and the sleeves should be a simple process. The change-over process should be adaptable to automation.

It would be desirable to provide a winding machine in which the apparatus for gripping an armature shaft can be changed easily and quickly, without requiring that the sleeves associated with the gripping apparatus be changed.

It would also be desirable to provide a winding machine in which the gripping apparatus and the sleeves can be removed and replaced as a single assembly.

It would also be desirable to provide a winding machine in which change-over of the gripping apparatus and the sleeves is adaptable to automation.

SUMMARY OF THE INVENTION

It is an object of this invention to provide a winding machine in which the apparatus for gripping an armature shaft can be changed easily and quickly, without requiring that the sleeves associated with the gripping apparatus be changed.

It is also an object of this invention to provide a winding machine in which the gripping apparatus and the sleeves can be removed and replaced as a single assembly.

It is another object of this invention to provide a winding machine in which change-over of the gripping apparatus and the sleeves is adaptable to automation.

In accordance with this invention, there is provided a winding machine in which a collet assembly can be quickly changed over by pulling it from the armature end of the winding machine and replacing it with another assembly. The apparatus uses keys and keyways (or pins and slots) to permit translation along the longitudinal axis while preventing rotation. The apparatus utilizes ball connections to longitudinally fix components, while permitting rotation around the longitudinal axis. The balls of the ball connections may be radially displaced to permit disengaging the components for removal and replacement.

In accordance with the principles of this invention, the collet assembly may be removed from the winding machine while the sleeves of the armature-holding assembly remain clamped to the winding machine. Alternatively, the collet assembly and the sleeves may be removed and replaced as a single assembly.

Actuators are provided to radially displace the balls of the ball connections. A screw and handle mechanism is provided to clamp or release the sleeves of the armature-holding assembly. Thus, the change-over process can be performed in a simple manner, without using tools. The screw and handle mechanism can be replaced with a power-actuated mechanism, making the apparatus well suited for automated change-over operations.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DETAILED DESCRIPTION OF THE PREFERRED EMBODIMENTS

Figure 1:
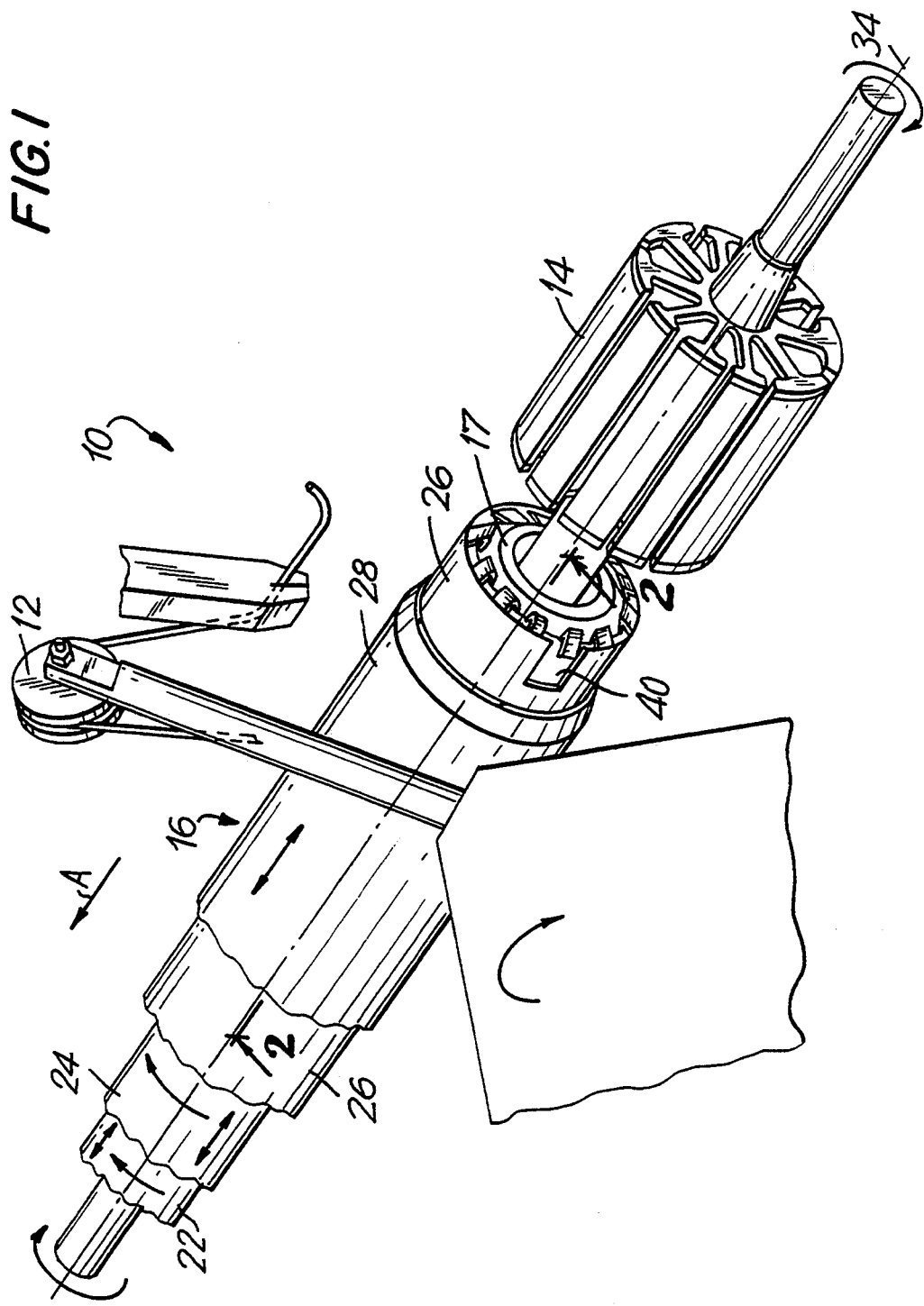
FIG. 1 is a partial perspective view of an armature winding machine in accordance with the principles of the present invention.

Referring now to the drawings, FIG. 1 shows a conventional flyer-type winding machine 10. Winding machine 10 includes a flyer 12 which revolves around an armature 14 (shown unwound) to wrap the armature with wire. Armature 14 is mounted in and positioned by an armature-holding assembly, designated generally by reference number 16. Because a portion of assembly 16 surrounds the commutator 17 of the armature, it may be necessary to change armature-holding assembly 16, when winding armatures of different sizes. For some applications, it may only be necessary to change the collet (e.g., to accommodate a differently sized armature shaft).

Figure 2:
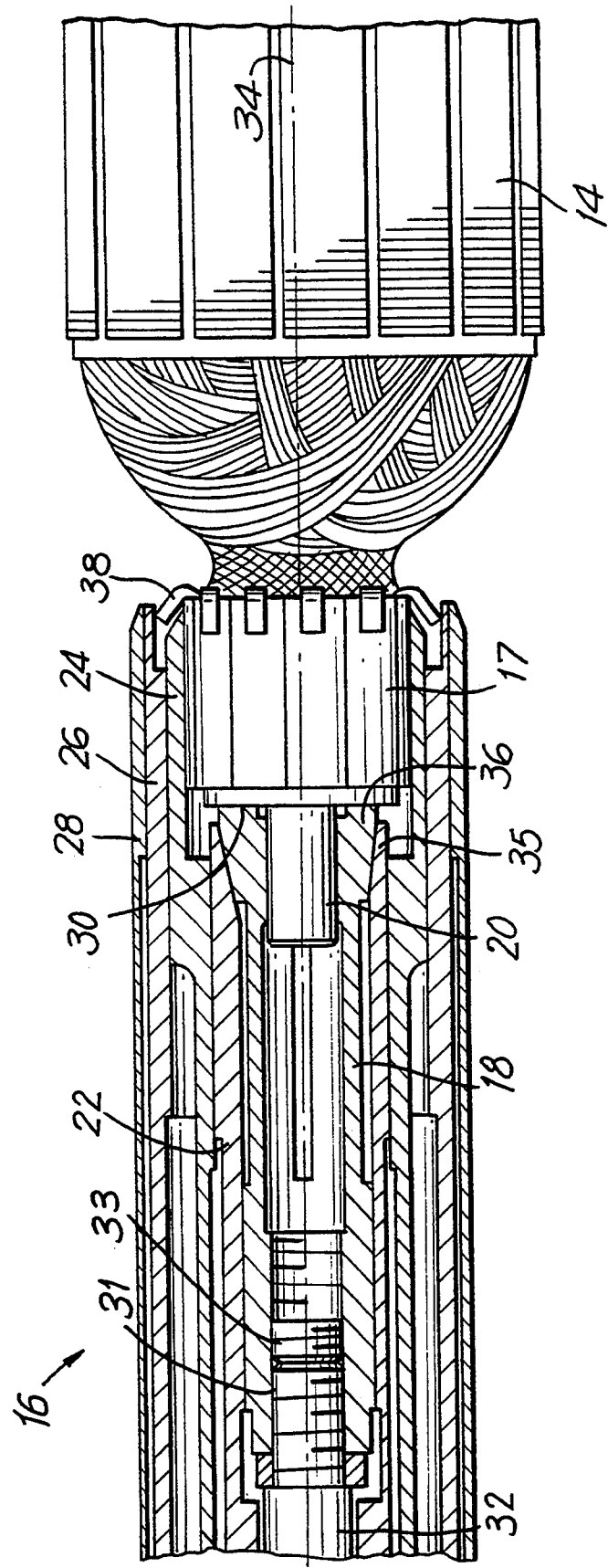
FIG. 2 is a partial longitudinal sectional view of an armature-holding assembly of the armature winding machine of FIG. 1.

Referring now to FIG. 2, armature-holding assembly 16 typically includes a split collet 18 adapted to grasp the armature shaft 20, a collet tube 22, a retainer tube 24, an internal sleeve 26, and an external sleeve 28 which slides on internal sleeve 26. Collet 18 is longitudinally fixed to the winding machine, with the front surface 30 of collet 18 abutting the end of the armature, to permit positioning of the armature relative to the winding machine. A threaded connection 31 connects a collet shaft 32 to collet 18. Threaded connection 31 is locked by opposing screw 33.

Collet tube 22 moves parallel to the longitudinal axis 34 of the armature to cause split collet 18 to grip or release armature shaft 20 as required. As collet tube 22 translates towards the armature, the frustoconical end 35 of the collet tube wedges onto the external surface 36 of collet 18, causing the collet to grip the armature shaft. Collet 18 and armature shaft 20 can rotate together to position the armature tangs or slots as required for the winding operations and for attaching lead wires to the commutator.

Retainer tube 24 engages the leads behind the commutator tangs. Tube 24 translates along longitudinal axis 34. Tube 24 must be rotated together with collet tube 22. The translation of tube 24 must be independent of other machine functions.

Internal sleeve 26 includes openings 40, which are uncovered by the external sleeve 28 during winding operations, when the coil leads are being attached to hooks 38. This sleeve is releasably fixed to the frame of the winder, and typically does not move during normal operations.

External sleeve 28 functions to vary slot filling and to selectively expose or cover openings 40 (FIG. 1) of concentric inner sleeve 26. During winding operations, external sleeve 28 translates parallel to longitudinal axis 34. Sleeve 28 can assume three distinct positions along its translation path: forward, intermediate, and rearward. Sleeve 28 is positionable independent of other tool actuation.

To wind an armature of a different size, collet 18 must be changed. It may also be necessary to change the entire armature-holding assembly 16. In a preferred embodiment of the invention, collet 18 can be quickly changed over by just pulling it out of the machine from the forward end (armature end) and replacing it with another. Alternatively, armature-holding assembly 16 can be removed and replaced as a single assembly (see FIG. 5).

Figure 3:
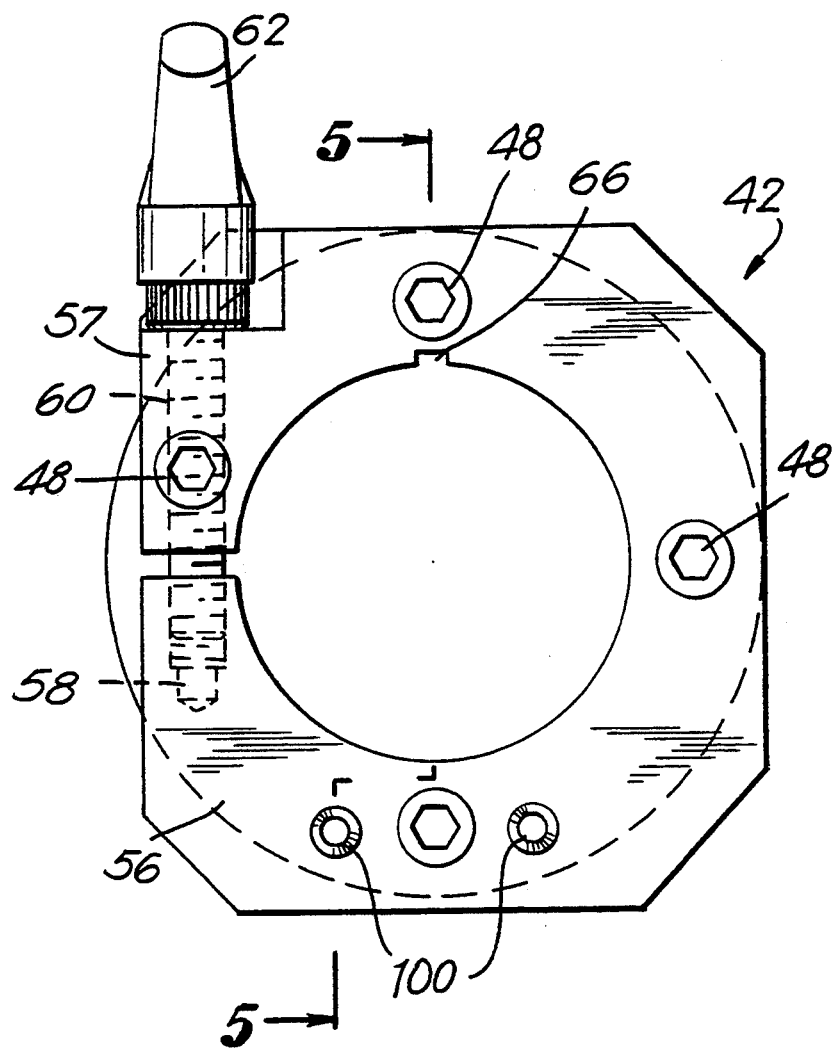
FIG. 3 is a cross-sectional view, from direction A of FIG. 1, of a collar mechanism of the armature winding machine of FIG. 1.
Figure 4:
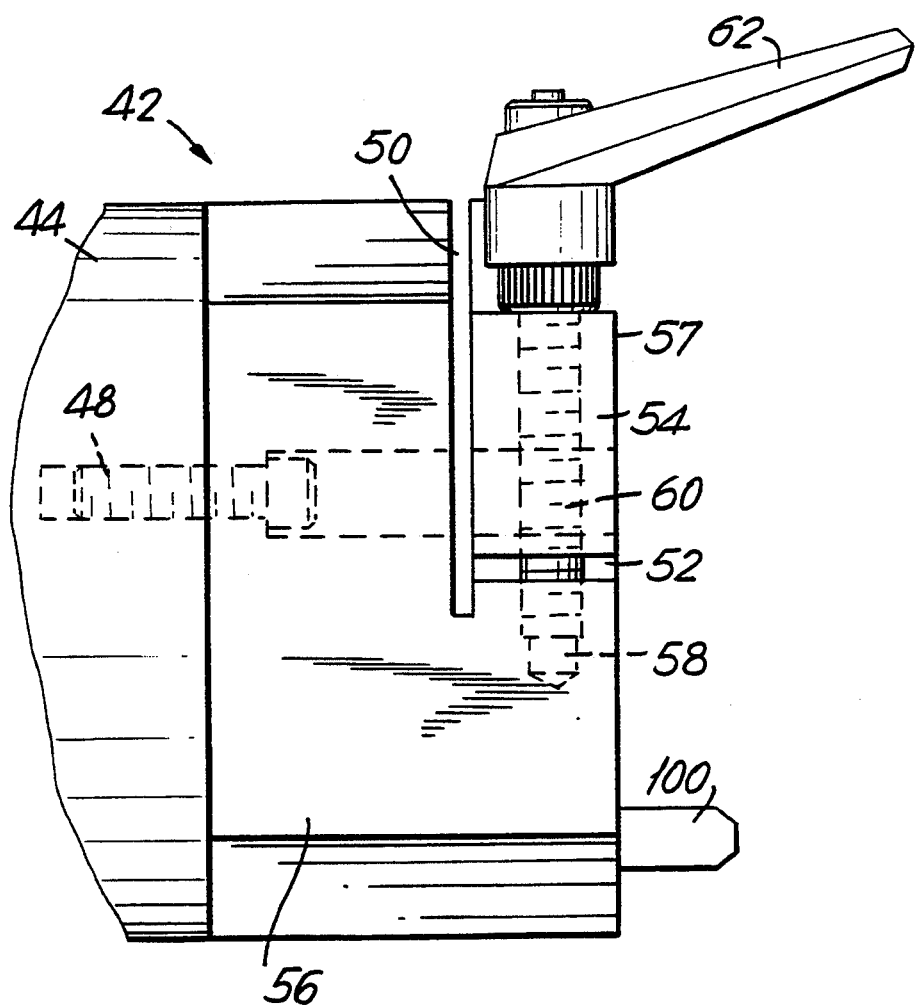
FIG. 4 is a partial side view of the collar mechanism of FIG. 3.
Figure 5:
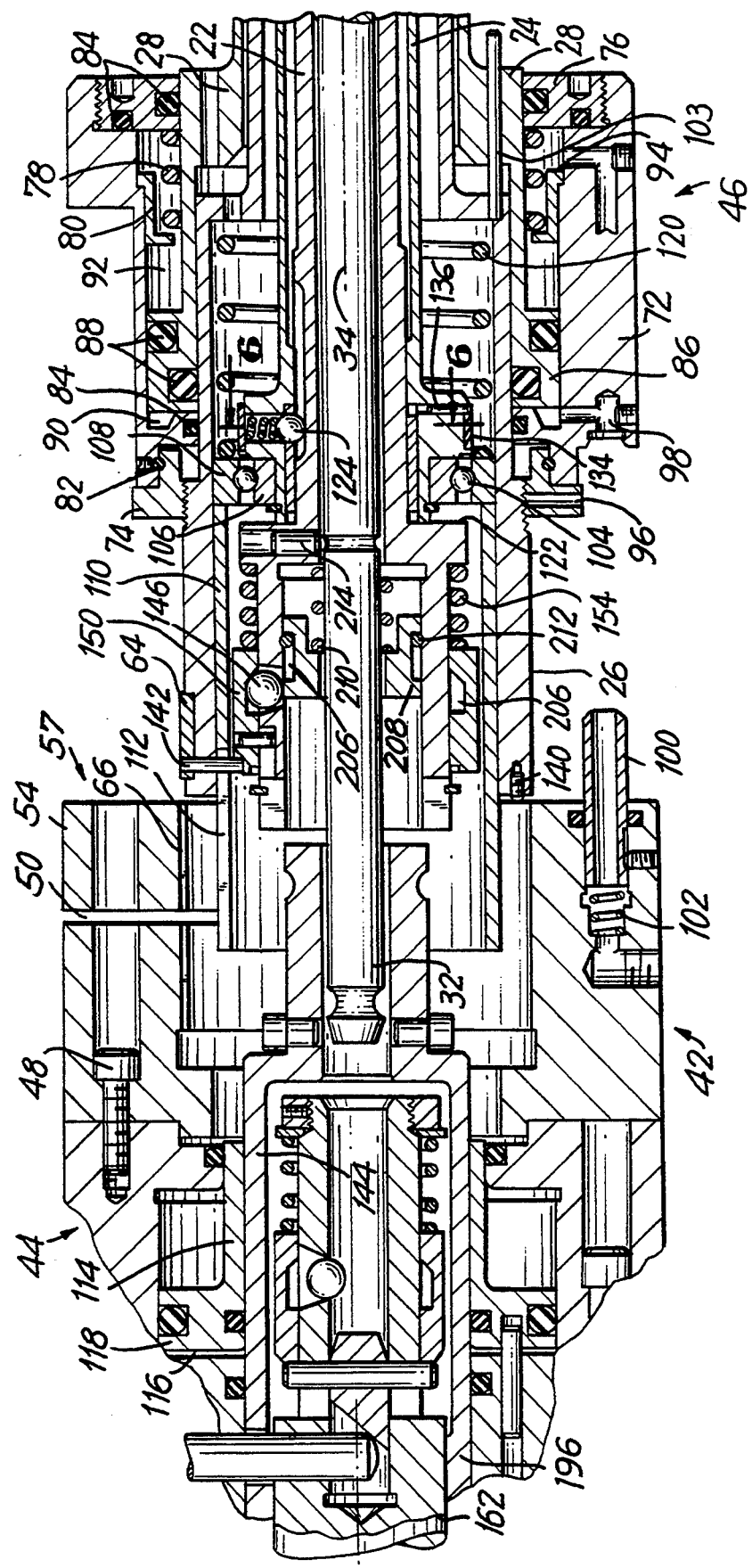
FIG. 5 is a continuation of the longitudinal sectional view of FIG. 2, taken along line 5—5 of FIG. 3, showing the armature-holding assembly partially inserted into the collar mechanism of FIGS. 3 and 4.

Referring to FIGS. 3-5, armature-holding assembly 16 engages a clamping collar 42 (shown in FIGS. 3 and 4). FIG. 5 shows the rear portion of armature-holding assembly 16, partially inserted into clamping collar 42. Clamping collar 42 is coupled to a turning assembly (designated generally by reference number 44) of the winding machine of the present invention.

Referring now to FIGS. 3 and 4, clamping collar 42 is flanged to a tube 44 of the winding machine by bolts 48. Two slots 50 and 52 in clamping collar 42 form a clamp 57 from portions 54 and 56. A threaded bore 58 is formed through portion 56 to receive a screw 60 and a handle 62. Screw 60 is free to rotate in an aligned bore in upper portion 54. Slots 50 and 52 allow movement of clamp 57 when screw 60 is turned, to clamp or release the rear portion of armature-holding assembly 16. Although a manual handle is used in this embodiment to adjust clamp 57, one skilled in the art will appreciate that this operation could be controlled automatically, using an actuator with a lever or other conventional means.

A connection mechanism 46, shown in FIG. 5, is mounted on internal sleeve 26 of armature-holding assembly 16, for engaging collar 42. Connection mechanism 46 enables assemblies 16 and collets 18 of different sizes (but having similar outside diameters at the engaging end) to be connected to clamping collar 42. Assemblies 16 are connected to the turning assembly of the winding machine by aligning and introducing a key 64 of internal sleeve 26 into a keyway 66 formed in clamping collar 42. The armature-holding assembly is then pushed until it is fully seated within the clamping collar, and screw 60 is tightened. The rear portion of internal sleeve 26 preferably fits smoothly within clamping member 42.

Connection member 46 includes an annular member 72, an adjusting ring 74, an externally-threaded disk 76, a spring 78, and a cup 80. Annular member 72 is connected to adjusting ring 74 via a crown of balls 82. Balls 82 can rotate between a circumferential groove of ring 74 and an opposing circumferential groove in annular member 72. The opposite end of annular member 72 is closed by externally threaded disk 76. Seals 84 create a pressure-tight closure at the two ends of annular member 72.

With reference to FIG. 5, the apparatus for translating the sleeves of armature-holding member 16 along longitudinal axis 34 will now be described.

An end 86 of external sleeve 28 can slide in annular member 72 to cause external sleeve 28 to cover or expose hooks 38 (FIG. 2). Seals 88 divide annular member 72 into two annular, air-tight chambers 90 and 92, one on either side of end 86 (chamber 92 surrounds cup 80). Cup 80 is slidably mounted on the internal surface of annular member 72. Preloaded spring 78 biases cup 80 towards the rear end of annular member 72. When external sleeve 28 is not acting upon cup 80, a ridge 94 of the cup will prevent further movement of cup 80 by abutting the end of a pathway of annular member 72.

Adjusting ring 74 can be rotated on a threaded surface of internal sleeve 26 to adjust the longitudinal rest position of external sleeve 28. This typically may be done when setting the equipment for a particular armature; further adjustment is not required for normal change over of armature-holding assembly 16. A threaded pin 96 may be provided in a radial bore in ring 74, to act upon the thread of internal sleeve 26, to prevent ring 74 from loosening and rotating once the desired adjustment has been made.

Once the adjustment described above has been made, a fixture (not shown) fixes annular member 72 to ring 74 and prevents annular member 72 from rotating on balls 82. This fixture also determines the angular position of fluid feed bores 98 of annular member 72 relative to fluid feed nozzles 100 of clamping collar 42. Nozzles 100 are biased by springs 102, and automatically engage bores 98 of annular member 72 when armature-holding assembly 16 is mounted in clamping collar 42. Nozzles 100 feed pressurized fluid (e.g., from pneumatic equipment) to chambers 90 and 92, to cause external sleeve 28 to translate along longitudinal axis 34, as described below.

The position of external sleeve 28 along axis 34 is controlled by the air pressure in chambers 90 and 92. The chamber on either side of end 86 of external sleeve 28 can be discharged so that spring 78 will bias cup 80 (and therefore external sleeve 28), moving external sleeve 28 to an intermediate position. Chamber 90 can be pressurized (while chamber 92 is discharged) such that external sleeve 28 will move until it abuts against the forward end of annular member 72. Spring 78 also acts to absorb shock which might occur when chambers 90 and 92 are pressurized and discharged, respectively. To move external sleeve 28 to its rearward position, chamber 90 is discharged, and chamber 92 is pressurized. A pin 103 fixed to internal sleeve 26 slides in a keyway in external sleeve 28 to prevent sleeves 26 and 28 from rotating relative to each other.

Retaining sleeve 24 slides on internal sleeve 26, supported by its forward portion and by sleeve 22. Bearings 104 are captured within an inner ring 106 and an outer ring 108. Inner ring 106 is fixed to retaining sleeve 24 and can rotate on bearings 104. A gap separates outer ring 108 from internal sleeve 26. Outer ring 108 does not rotate, but rather slides along longitudinal axis 34.

Armature-holding assembly 16 includes a tube 110 which slides longitudinally on the internal surface of inner sleeve 26 to cause retainer tube 24 to move forward (i.e., towards hooks 38 of FIG. 2). Tube 110 has an open-ended slot 112 extending parallel to axis 34, which allows tube 110 to move relative to a pin 142 in internal shield 26 (discussed below). When armature-holding assembly 16 fully engages clamping collar 42, an annular ring 114 engages the slotted end of tube 110. A fluid feed system (not shown) pressurizes an air-tight chamber 116 to bias an end 118 of ring 116, thereby causing tube 110 to translate along axis 34. Tube 110 then exerts a force upon external ring 108, against the biasing action of spring 120, moving retaining sleeve 24 forward. When the pressure in chamber 116 is discharged, spring 120 will act upon tube 110 and retaining tube 24 via external ring 108, until retaining tube 24 stops against a ridge 122 of collet tube 22.

Figure 6:
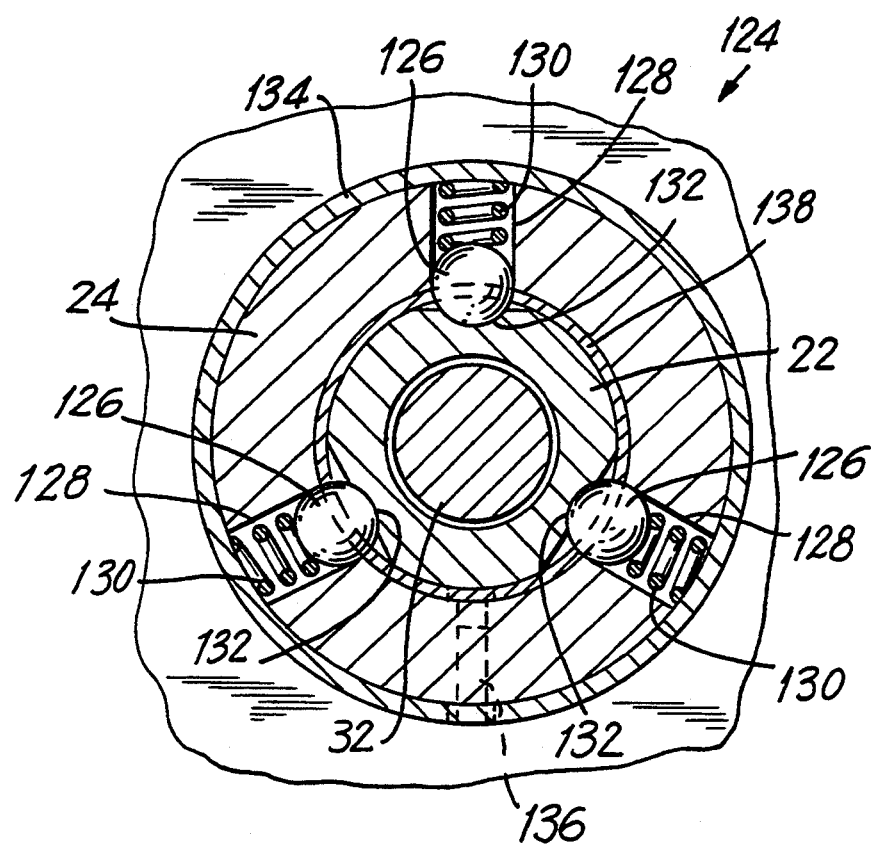
FIG. 6 is a partial cross-sectional view of the armature-holding assembly of FIG. 5, taken along lines 6—6.

Collet tube 22 transmits rotational motion to retaining tube 24 via a ball connection, designated generally by reference number 124. Ball connection 124, shown in greater detail in FIG. 6, typically may include three balls 126 which are housed in bores 128 in retainer tube 24. Preloaded springs 130, mounted in bores 128, maintain the engagement of each of balls 126 with a respective longitudinal pathway 132 in collet tube 22. Pathways 132 allow retaining tube 24 to translate independently of collet tube 22, while ensuring that tubes 22 and 24 rotate together. A ring 134 closes bores 128. A pin 136 in a radial bore of retaining sleeve 24 keeps ring 134 in place. An internal ring 138, having V-shaped bores for engaging balls 126, traps the balls within bores 128 when collet tube 22 is removed (e.g., for repair) from retaining sleeve 24.

Figure 7:
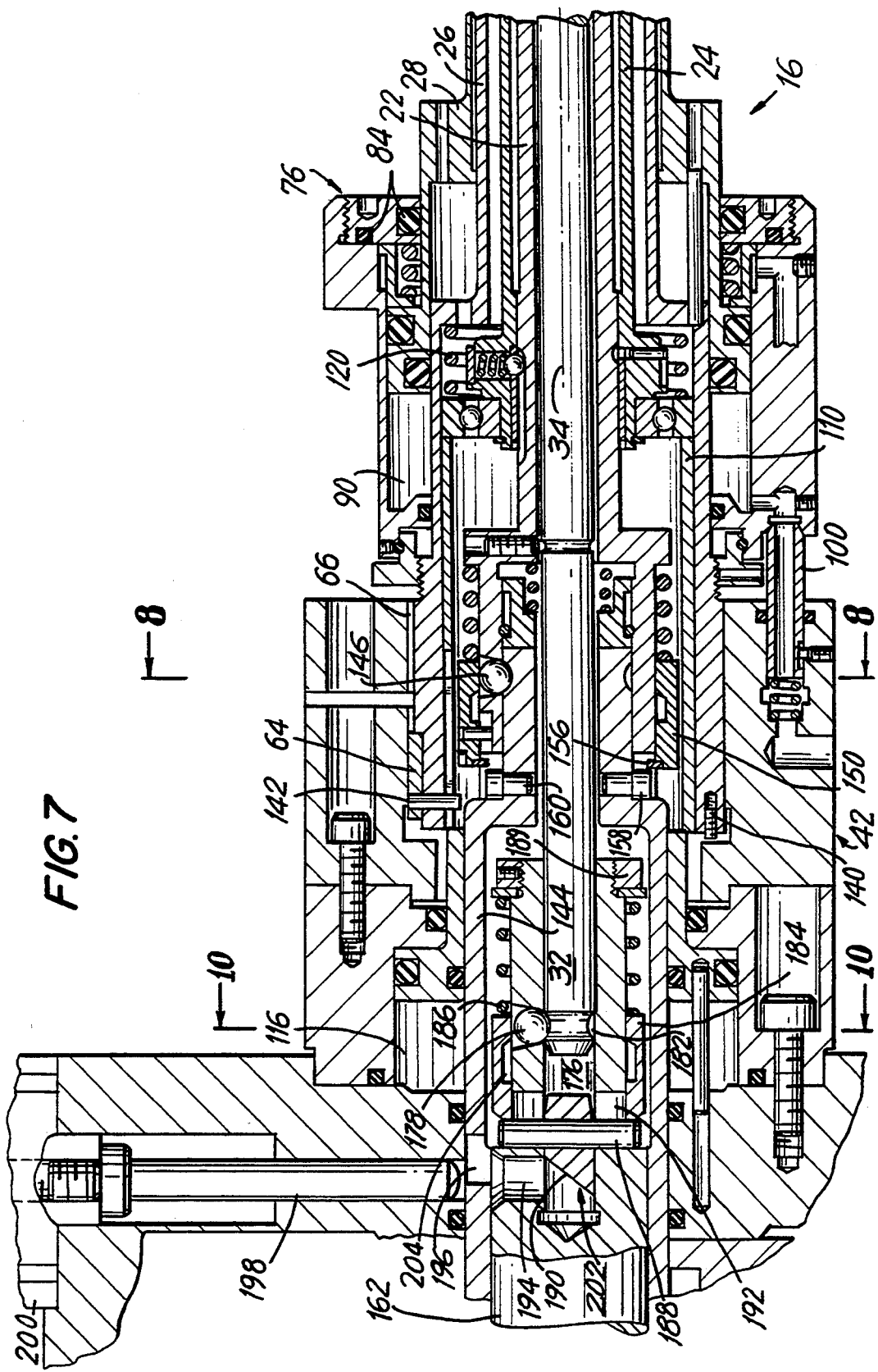
FIG. 7 is the same view as FIG. 5, showing the armature-holding assembly fully inserted into the collar mechanism of FIG. 3.

Referring now to FIG. 7, armature-holding assembly 16 is shown fully inserted into clamping collar 42. A registering pin 140 threaded into the distal end of internal sleeve 26 abuts against a shoulder of clamping collar 42. The depth to which pin 140 is threaded determines the longitudinal positioning of internal sleeve 26. The angular orientation of internal sleeve 26 is fixed by key 64 and keyway 66. A radial pin 142 passes through a radial bore of internal sleeve 26 and into keyway 66 of key 64, such that it remains fixed to internal sleeve 26.

Figure 8:
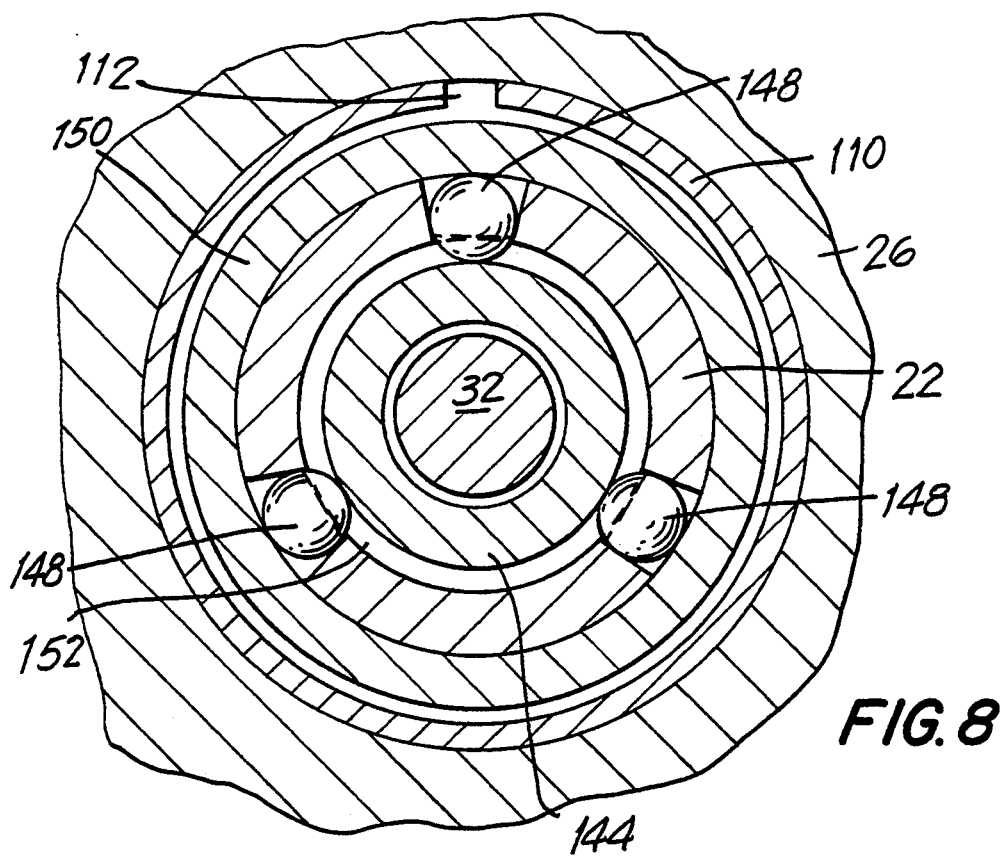
FIG. 8 is a partial cross-sectional view of FIG. 7, taken along lines 8—8.

Collet tube 22 is secured to an actuating collar 144 by means of a ball connection, designated generally by reference number 146. Connection 146, also shown in FIG. 8, includes balls 148 and an annular cup 150. Each of balls 148 is seated in a V-shaped bore in collet tube 22. The balls extend beyond the V-shaped bore to engage a circumferential groove 152 of collar 144. The engagement of balls 148 in groove 152 transmits a translation of actuating collar 144 to collet tube 22. Cup 150, biased against a ring 156 by a spring 154, maintains balls 148 in engagement with groove 152. Two radial pins 158 fixed to collar 144 engage open-ended slots 160 of collet tube 22, causing the collet tube to rotate when collar 144 rotates. A shaft 162 drives collar 144.

Figure 9:
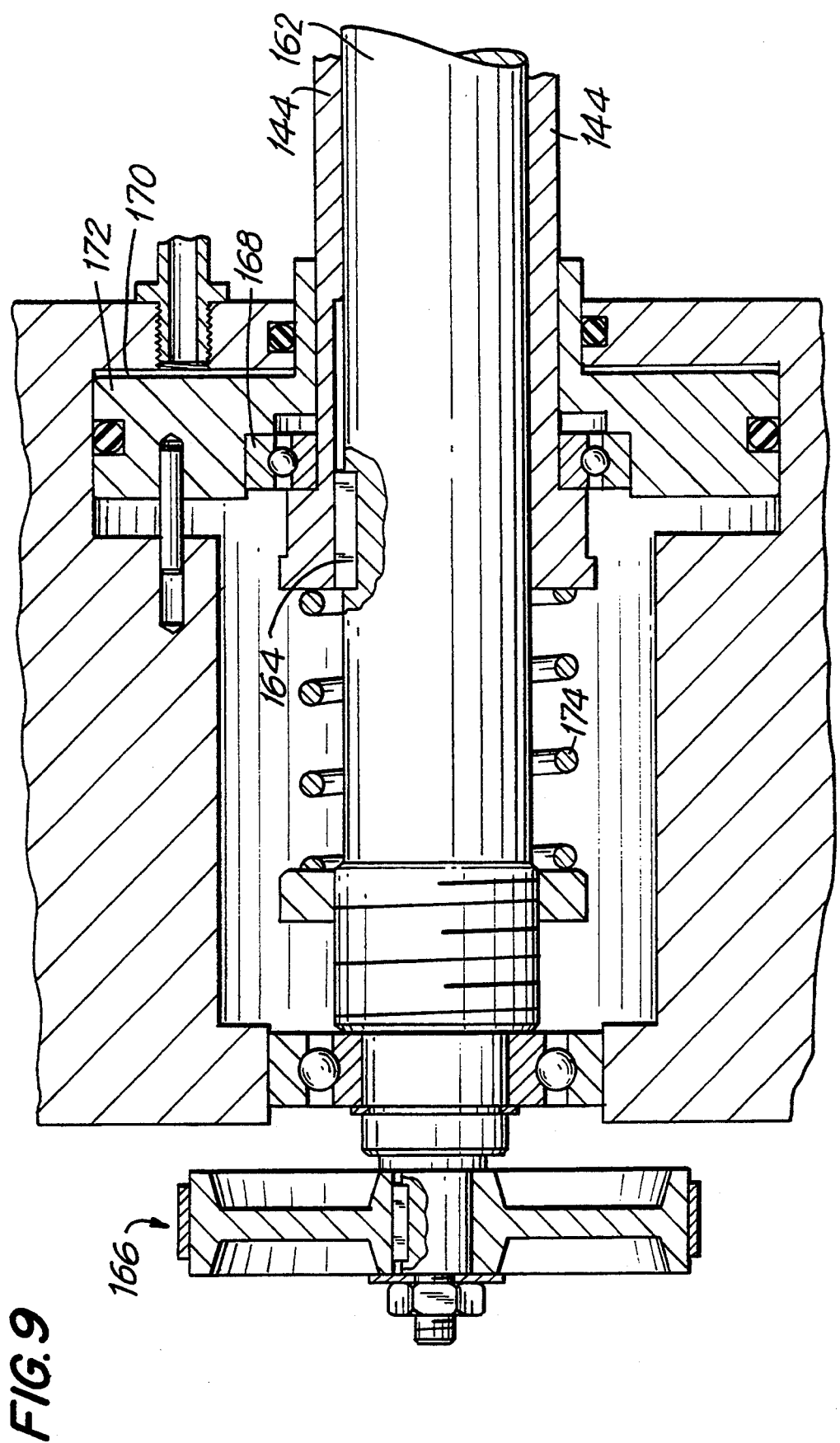
FIG. 9 is a partial longitudinal sectional view, partly in fragment, of the turning apparatus of the armature winding machine of FIG. 1.

Referring now to FIGS. 7 and 9, a key 164 transmits the rotational motion of shaft 162 to collar 144. A conventional drive means 166 typically may be used to rotate shaft 162 and collar 144. Collar 144 is supported to rotate on a bearing 168, and slides relative to shaft 162 by means of an actuator 170. Actuator 170 includes a sliding piston 172, which is coupled to collar 144 via bearing 168. A preloaded spring 174 acts upon collar 144 to wedge collet tube 22 on collet 18, to cause the collet to grip the armature shaft. To release the armature shaft, actuator 170 is fed with a fluid (e.g., air) to cause collar 144 to move against the biasing action of spring 174. When collar 144 moves backwards (i.e., against spring 174), springs 120 urge collet tube 22 backwards, thereby releasing the gripping action of collet 18.

Figure 10:
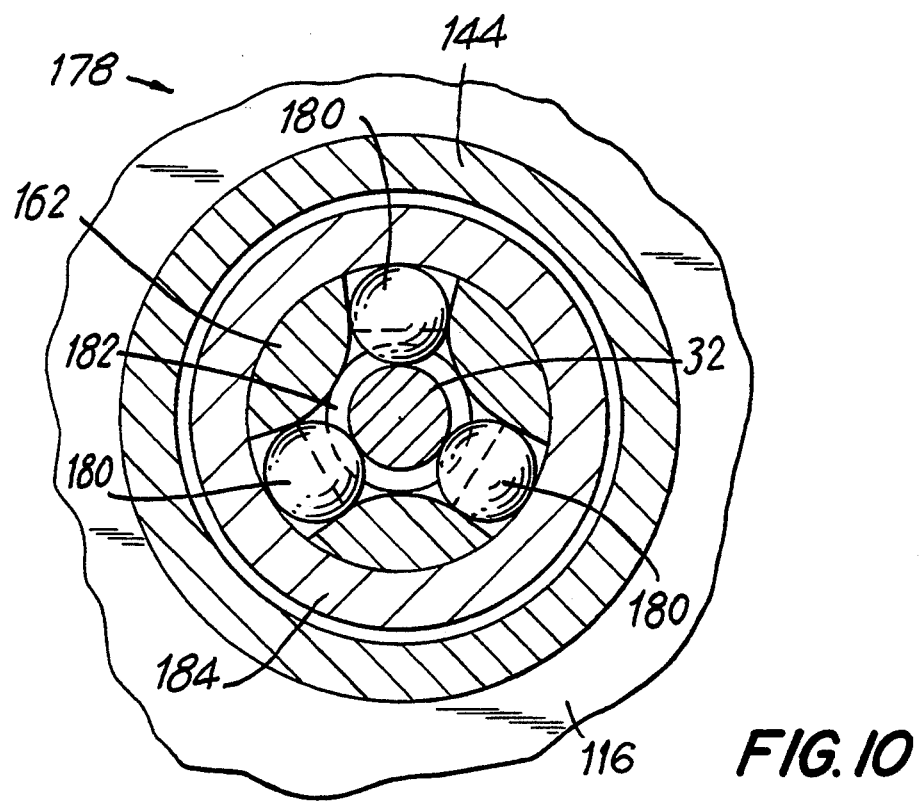
FIG. 10 is a partial cross-sectional view of FIG. 7, taken along lines 10—10.

As shown in FIG. 7, shaft 162 includes a longitudinal bore 176 for receiving collet shaft 32. Collet shaft 32 connects to shaft 162 by means of a ball connection, designated generally by reference number 178. Ball connection 178, also shown in FIG. 10, includes three balls 180 seated in V-shaped bores in shaft 162. The balls extend beyond the V-shaped bores to engage a circumferential groove 182 in collet shaft 32. The engagement of balls 180 in groove 182 fixes collet shaft 32 and collet 18 to shaft 162 in the longitudinal direction. A preloaded spring 186 biases a cup 184 against a pin 188. When cup 184 touches pin 188, part of cup 184 overlies balls 180, preventing the balls from disengaging groove 182. A ring 189, which is threaded onto shaft 162, captures spring 186 within the shaft.

Pin 188 is fixed to a cylindrical member 190 and protrudes into slots 192 of shaft 162. Cylindrical member 190 can slide in longitudinal bore 176 of shaft 162. A radial bore 194 in shaft 162 communicates with internal bore 176. By translating collar 144, a radial bore 196 in actuating collar 144 can be aligned with radial bore 194 of shaft 162. A pin 198 is advanced through aligned radial bores 194 and 196 by a cylinder 200, such that pin 198 presses on an inclined end 202 of cylindrical member 190. The pressing action of pin 198 causes cylindrical member 190 to translate along axis 34, causing pin 188 and cup 184 to compress spring 186 and to release ball assembly 178, allowing collet shaft 32 to be withdrawn.

The procedure for detaching collet 18, while armature-holding assembly 16 remains coupled to clamping collar 42, will now be described.

Referring to FIGS. 5, 7, and 9, actuator 170 is actuated to translate collar 144 to align radial bores 196 and 194. Cylinder 200 is actuated to cause pin 198 to extend into aligned bores 194 and 196, to act upon inclined end 202. Pin 188 acts on cup 184, causing the cup to act against spring 186 until circumferential recess 204 of cup 184 overlies balls 180. Collet 18 is then pulled towards the front end (i.e., away from shaft 162) of armature-holding assembly 16, causing collet shaft 32 to displace balls 180 into recess 204 of cup 184, releasing collet shaft 32 and collet 18. The collet and collet shaft may then be completely removed from the armature-holding assembly (e.g., for replacement or repair).

The procedure for detaching armature-holding assembly 16 as a single unit (all sleeves and the collet), will now be described with reference to FIGS. 5 and 7.

Annular chambers 90, 92, and 116 are discharged, and spring 120 pushes tube 110 backward. Spring 120 also biases the end of retaining tube 24 against ridge 122 of collet tube 22. Actuator 170 and cylinder 200 are actuated to disconnect collet shaft 32 from shaft 162 (as described above).

Screw handle 62 (FIG. 4) is turned so as to release the clamping action of clamp 57 on inner sleeve 26. Once clamp 57 has been released, the exterior surface of annular member 72 can be gripped and pulled towards the forward end of armature-holding assembly 16. Because of its connection to member 72 (via ring 74), internal sleeve 26 also will slide forward.

Referring now to FIG. 5, pin 142 will move with internal sleeve 26 and, at a certain point, will abut and push cup 150 against spring 154 until the spring cannot be compressed further. A circumferential recess 206 of cup 150 will overlay balls 148, allowing collet tube 22 to move forwards and dislodge balls 148 into recess 206. Because ridge 122 of collet tube 24 abuts the end of retaining tube 24, movement of collet tube 22 also causes retaining tube 24 to move. A pin in cup 150 slides in a slot in tube 22 to prevent tube 22 from rotating relative to internal sleeve 26 when mounting armature-holding assembly 16 onto the winding machine. This ensures alignment of slot 160 with pin 158.

As collet tube 22 disengages collar 144, a cup 208 slidably mounted inside collet tube 22 is biased by a spring 210 to move backwards until it stops against transverse pins 212. Cup 208 contacts balls 148 (FIG. 5) to keep them in recess 206 of cup 150 to facilitate subsequent connection of collet tube 22 to collar 144. Cup 208 and spring 210 also function as a shock absorber when remounting and connecting collet tube 22 to collar 144.

A spring ball pin 214 may be fixed to tube 22 to prevent movement of collet 18 with respect to tube 22 when the assembly is dismounted and when collet 18 is changed with the entire armature-holding assembly. A slight pulling action on collet 18 will cause spring ball pin 214 to dislodge from its seat on shaft 32, allowing collet 18 and collet shaft 32 to be removed from the dismounted assembly.

Armature-holding assemblies 16 and collets 18 can be stored in automatic dispensers, and may be changed completely automatically. A universal gripper can be used to automate tool change-over of the winding machine.

One skilled in the art will appreciate that the present invention can be practiced by other than the described embodiments, which are presented for purposes of illustration and not of limitation, and the present invention is limited only by the claims which follow.

What is claimed is:

1. Apparatus for holding an armature having an armature shaft, said apparatus comprising:
    a collect-receiving shaft having a longitudinal bore;
    a collet having a first end for gripping said armature shaft and a second end positioned in said longitudinal bore;
    means coupled to said collet-receiving shaft for coupling said second end of said collet to said collet-receiving shaft by engaging the exterior of said second end of said collet within said longitudinal bore to prevent axial movement between said collet and said collet-receiving shaft; and
    means coupled to said coupling means for selectively actuating said coupling means to release said collet from said collet-receiving shaft.

2. The apparatus defined in claim 1, further including means for locking said coupling means in said collet-receiving shaft when said collet is removed from said longitudinal bore.

3. The apparatus defined in claim 1 wherein said actuating means includes means for displacing said coupling means such that said coupling means remains coupled to said collet-receiving shaft when said collect is removed.

4. The apparatus defined in claim 1 wherein said coupling means comprises a ball connection comprising a ball engaging a corresponding groove, said groove located within one of said collet-receiving shaft and said second end of said collet.

5. The apparatus defined in claim 4 wherein:
    said ball is positioned in a bore in said collet-receiving shaft transverse to said longitudinal bore;
    said second end of said collet is substantially solid; and
    said groove is in the exterior of said second end of said collet.

6. The apparatus defined in claim 5 wherein:
    said bore transverse to said longitudinal bore is synclinal toward said longitudinal bore; and
    the portion of said transverse bore adjacent said longitudinal bore is narrower than the diameter of said ball such that said ball cannot move from said transverse bore into said longitudinal bore.

7. The apparatus defined in claim 1 further including a collet tube positioned around said collet for selectively causing said collet to grip said armature shaft.

8. Apparatus for holding an armature having an armature shaft, said apparatus comprising:
    a collet-receiving shaft having a longitudinal bore;
    a collet having a first end for gripping said armature shaft and a second end positioned in said longitudinal bore;
    means coupled to said collet-receiving shaft for coupling said second end of said collet to said collet-receiving shaft by engaging the exterior of said second end of said collet within said longitudinal bore to prevent axial movement between said collet and said collet-receiving shaft; and
    means for rotating said armature shaft.

9. The apparatus defined in claim 8 wherein said means for rotating said armature shaft rotates said collet-receiving shaft to thereby rotate said armature shaft.

10. The apparatus defined in claim 9 further including a sleeve positioned around said collet-receiving shaft and coupled to said collet-receiving shaft to rotate with said collet-receiving shaft.

11. The apparatus defined in claim 10 further including a collet tube coupled to said sleeve and positioned around said collet; wherein:
    said collet tube is coupled to said sleeve to rotate with said sleeve; and
    said collet tube grips said collet to thereby rotate said armature shaft.

12. The apparatus defined in claim 11 further including means for longitudinally moving said sleeve to thereby longitudinally move said collet tube to cause said collet tube to grip said armature shaft.

13. The apparatus defined in claim 8 further comprising a collet tube positioned around said collet for selectively causing said collet to grip said armature shaft.

14. The apparatus defined in claim 13 wherein said collet tube is coupled to said means for rotating said armature shaft to thereby rotate said armature shaft.

15. The apparatus defined in claim 14 further including means for longitudinally moving said collet tube to cause said collet to grip said armature shaft.

16. Apparatus for holding an armature having an armature shaft, said apparatus comprising:
    a collet-receiving shaft having a longitudinal bore, said longitudinal bore having a base end and an open end;
    a collet having a first end for gripping said armature shaft and a second end positioned in said longitudinal bore;
    means coupled to said collet-receiving shaft for coupling said second end of said collet to said collet-receiving shaft by engaging the exterior of said second end of said collet within said longitudinal bore; and
    means coupled to said coupling means for selectively actuating said coupling means to release said collet from said collet-receiving shaft;
    wherein said coupling means is positioned entirely between said base end and said open end of said longitudinal bore.

17. The apparatus defined in claim 16 further including means for locking said coupling means in said collet-receiving shaft when said collet is removed from said longitudinal bore.

18. The apparatus defined in claim 16 wherein said actuating means includes means for displacing said coupling means such that said coupling means remains coupled to said collet-receiving shaft when said collet is removed.

19. The apparatus defined in claim 16 wherein said actuating means further comprises:
    means positioned inside said collet-receiving shaft for contacting said coupling means; and
    means positioned at least partially outside said collet-receiving shaft for extending inside said collet-receiving shaft to contact and thereby cause said means positioned inside said collet-receiving shaft to actuate said coupling means to release said collet from said collet-receiving shaft.

20. The apparatus defined in claim 19 wherein said means for extending inside said collet-receiving shaft extends through a bore in said collet-receiving shaft transverse to said longitudinal bore.

* * * * *